United States Patent [19]
Erickson

[11] Patent Number: 5,482,417
[45] Date of Patent: Jan. 9, 1996

[54] CAM AND WEDGE-TYPE SELF-LOCKING MECHANISM

[75] Inventor: Robert A. Erickson, Raleigh, N.C.

[73] Assignee: Kennametal Inc., Latrobe, Pa.

[21] Appl. No.: 135,096

[22] Filed: Oct. 12, 1993

[51] Int. Cl.⁶ .......................... F16B 19/00; F16B 39/284
[52] U.S. Cl. .......................... 411/306; 411/324; 411/354; 411/947; 29/456
[58] Field of Search .................................... 411/254, 255, 411/264, 271, 272, 273, 306, 324, 325, 348, 354; 29/456

[56] References Cited

U.S. PATENT DOCUMENTS

| | | |
|---|---|---|
| 1,767,287 | 6/1930 | Hosking . |
| 1,874,595 | 8/1932 | Olson . |
| 1,874,657 | 8/1932 | Trotter . |
| 2,601,651 | 6/1952 | Wandy . |
| 2,647,942 | 8/1953 | Borden et al. . |
| 2,941,563 | 6/1960 | Gouverneur, II . |
| 2,991,695 | 2/1960 | Jones . |
| 3,618,135 | 11/1971 | Weller .................... 411/271 X |
| 3,777,356 | 12/1973 | Hemingway ............... 29/428 |
| 3,843,984 | 10/1974 | Bagheri et al. . |
| 4,309,140 | 1/1982 | Steffen et al. ............... 411/264 |
| 4,576,402 | 3/1986 | Murray et al. ............... 411/264 X |
| 4,822,225 | 4/1989 | Haberle ..................... 411/306 |
| 5,169,270 | 12/1992 | Erickson ................... 411/306 |
| 5,244,323 | 9/1993 | Tucchio ..................... 411/271 |

FOREIGN PATENT DOCUMENTS

3035119  4/1982  Germany .................. 411/383

Primary Examiner—Neill R. Wilson
Attorney, Agent, or Firm—James G. Porcelli

[57] ABSTRACT

The present invention entails a self-locking mechanism (10) for locking a rotatable member such as a screw, bolt, lock rod, etc. In the case of a lock rod (50) that secures a tool holder (126) within a tool block (122), the self-locking mechanism (10) of the present invention includes at least one cam surface (52) connected between the lock rod (50) and a rotating carrier (14) having at least one wedge surface (26). The rotating carrier (14), wedge surface (26), and cam surface (52) are shaped and disposed such that they can be rotated by a driver (16) in unison as the lock rod (50) is rotated between locked and unlocked positions. However, the rotating carrier (14), wedge surface (26) and cam surface (52) are disposed and shaped such that the cam surface (52) and wedge surface (26) will, under the influence of the lock rod, move to a wedged self-locking position after the lock rod (50) has assumed a locked position. The driver (16) is designed with respect to the rotating carrier (14), wedge surface (26), and cam surface (52) such that the driver (16) will rotate the cam surface (52) and wedge surface (26) with respect to each other such that they are moved from a wedged locked position and thereafter the rotating carrier (14), wedge surface (26), and cam surface (52) can be rotated in unison as the lock rod (50) itself is rotated from the locked position to the unlocked position.

18 Claims, 9 Drawing Sheets

CAM AND WEDGE-TYPE SELF-LOCKING MECHANISM

BACKGROUND OF THE INVENTION

The present invention relates to tool-locking devices and more particularly to a cam and wedge self-locking mechanism for a tool.

BACKGROUND OF THE INVENTION

In the tool industry, quick-change tool holders are common place and are used for a wide variety of applications. One such quick-change tool holder in wide use today is the KM series manufactured and sold by Kennametal Inc. of Latrobe, Pa. For a complete and unified understanding of the KM type tool holder, one is referred to the following U.S. Pat. Nos.: 4,836,068; 4,747,735; 4,736,659; 4,726,269; 4,723,877; 4,708,048; and 5,169,270. The KM tool holder series utilizes a ball-locking system to hold a tool holder in a tool block. The tool holder includes a shank having one or more apertures formed therein. A threaded locking rod extends through the central portion of the tool block and holder assembly. Formed on the locking rod is a ramp or cam that is effective to engage one or more locking balls disposed between the locking rod and the aperture or apertures of the shank. To lock the tool holder within the tool block, the locking rod is advanced such that the ramp or cam engages the locking ball or balls and urges the same outwardly into locking engagement with the aperture or apertures formed in the shank. To unlock the tool holder from the tool block, the locking rod is retracted in the opposite direction allowing the balls to roll down the ramp or cam and out of the locking position with the apertures of the tool holder shank. Hence, it is the axial movement of the lock rod itself and the ramp structure that results in an inward disengagement or outward engagement of the balls with the tool holder. Typically, this method requires several rotations of a nut threadedly engaged with a portion of the lock rod to obtain the amount of axial movement necessary to fully engage or disengage the tool holder.

In order to facilitate quicker and more efficient engagement and disengagement of the tool holder, Krupp Widia has developed a mechanism which is disclosed in European Patent Application No. 0369211. In this design, a cam assembly, which includes a rotatable shaft and a cam surface located on the remote end of the shaft, drives the balls into a locking position with the shank of the tool holder and maintains the locked relationship. As the cam assembly is rotated, it is not the axial movement of the mechanism that locks or disengages the ball, but instead the rotational movement of the cam structure itself creates the locked relationship. To lock the tool holder with the shank, the cam is rotated and in the process the cam surface engages one or more locking balls and drives them outwardly into locking engagement with the shank of the tool holder. The cam assembly is supported in a housing which provides an interference fit to the shaft to inhibit rotation of the shaft. In the unlocked or disengaged position, the balls rest in recessed portions of the cam assembly. The angle of the cam surface maintains the locking balls in an engaged or disengaged position as long as the cam remains in the selected position. This cam assembly allows quicker and more efficient locking and release of the tool holder because only a turn of 180° or less is required to fully engage or disengage the locking balls.

It is true that there are many advantages to the cam assembly design of Krupp Widia, but in some applications there is a tendency for the cam assembly to self release. The cam assembly is sometimes "backed-off" due to high forces being transmitted back through the balls to the screw which overcome the friction forces created by the interference fit. The resulting rotation of the shaft results in an altered cam position, and thereby complete or partial disengagement of the ball. Due to the physical constraints of many conventional tool holders, it is not practically possible to modify the angle of the cam to avoid such self relief.

In another application, Kennametal developed a compressible and expandable screw locking mechanism for use in conjunction with a lock rod and ball locking assembly. This compressible and expandable screw locking mechanism is disclosed and shown in U.S. Pat. No. 5,169,270. While there are many advantages to this compressible and expandable screw locking mechanism, by the nature of this design, it was found that in very limited cases it too would "back off" when vibration having certain harmonic frequencies passed through the tool block and tool holder.

Therefore, there has and continues to be a need for a self-locking mechanism that will resist "backing off" due to forces acting back through the lock rod or certain harmonic frequencies acting through the tool holder and the tool block.

SUMMARY AND OBJECTS OF THE INVENTION

The present invention entails a self-locking mechanism for securely locking a screw, shaft, lock rod or the like. The self-locking mechanism of the present invention includes a rotating carrier rotatably mounted within a tool block or housing. The rotating carrier includes at least one wedge surface that is designed to engage and bind with a cam surface that is operatively connected to the member (e.g. lock rod) to be locked. A driver is provided for turning the rotating carrier, wedge surface, and cam surface in unison when the member to be locked is moved between the locked and unlocked positions. However, the self-locking mechanism of the present invention is designed to automatically assume a wedged locking position when the lock rod or the particular member that is being locked assumes a locked position. To unlock the self-locking mechanism, the driver is designed to rotate the wedge surface and cam surface with respect to each other such that they are disengaged from the wedged locked position and such that the cam and wedge surfaces can be rotated simultaneously together. This permits the wedge surface, cam surface, and lock rod to be rotated together and enables the lock rod or other locking member to be rotated from the locked position in a housing, such as a tool block, to an unlocked position.

It is therefore an object of the present invention to provide a self-locking mechanism for a lock rod or other type of rotating locking member that overcomes the disadvantages of prior art self-locking mechanisms and which will withstand "back-off" forces transmitted back to the self-locking mechanism by the lock rod or the like and which will further withstand and resist unlocking due to certain harmonic frequencies transmitted through the tool and tool holder.

Another object of the present invention resides in the provision of a self-locking mechanism of a design that is easily made compatible with existing conventional quick-change tooling.

It is also an object of the present invention to provide a self-locking mechanism that is easy to use and which is reliable.

Other objects and advantages of the present invention will become apparent and obvious from a study of the following description and the accompanying drawings which are merely illustrative of such invention.

DETAILED DESCRIPTION OF THE INVENTION

Figure 3:
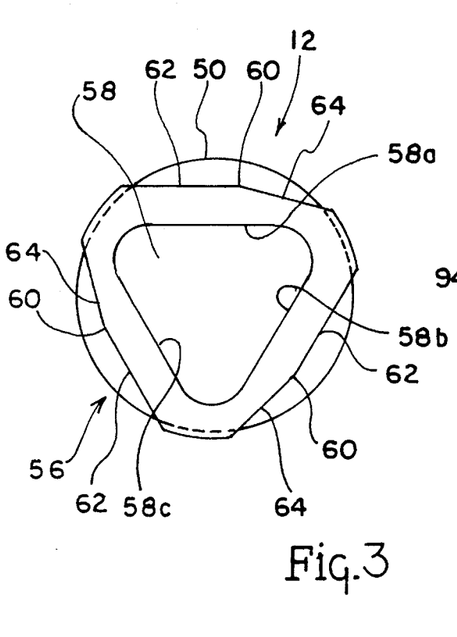
FIG. 3 is a view, partially rotated, of the end of a lock rod having a cam head that forms a part of the design shown in FIG. 1.
Figure 4:
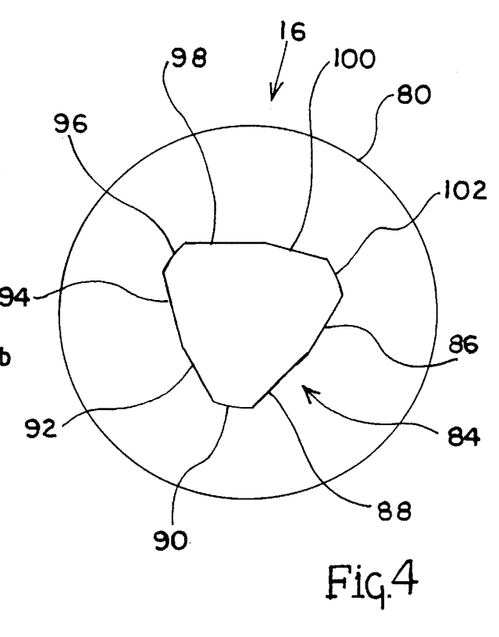
FIG. 4 is an end view, partially rotated, of the turning head of the driver that forms a part of the present invention.
Figure 5:
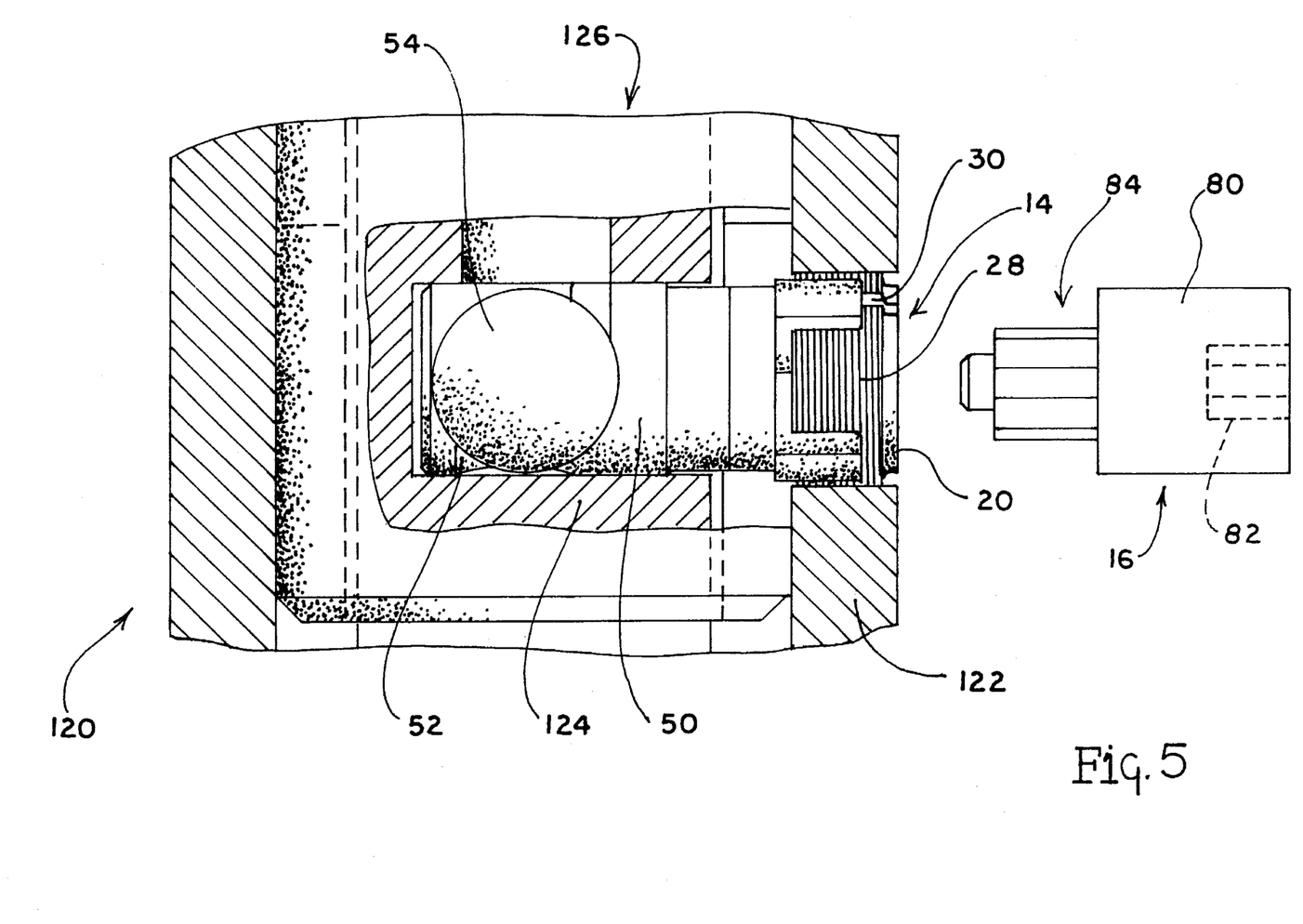
FIG. 5 is a fragmentary-sectional view showing the self-locking mechanism of the present invention incorporated into a conventional tool holder and block assembly.

With further reference to the drawings, and particularly to FIGS. 1–5, the self-locking mechanism of the present invention is shown therein and indicated generally by the numeral 10. As will be appreciated from subsequent portions of this disclosure, the self-locking mechanism 10 is designed to lock a rotating locking member such as a screw or bolt. In the case of the embodiment illustrated herein, the rotating locking member is indicated generally by the numeral 12 and is shown in the form of a lock rod 50 that is housed within a tool block that is adapted to receive and hold a tool holder 126 (FIG. 5). Lock rod 50 includes a cam head indicated generally by the numeral 56. Cam head 56 is rotatably contained within a rotating carrier indicated generally by the numeral 14. A driver, indicated generally by the numeral 16, is designed to rotate or drive the rotating carrier 14 as well as the rotating locking member 12. As will be appreciated from subsequent portions of the disclosure, the self-locking mechanism 10 basically comprises the rotating carrier 14 and the cam head 56 that is secured to the rotating locking member 12. Essentially, the self-locking mechanism 10 is designed to assume a wedge-locked mode in response to the rotating locking member 12 and rotating carrier 14 assuming a selected relative position with respect to each other. In addition, driver 16 is designed to provide for relative rotational movement between the rotating carrier 14 and the rotating locking member 12 so as to unlock the same. Thereafter, again as will be appreciated from subsequent portions of this disclosure, the driver 16 is designed to simultaneously rotate the rotating carrier 14 along with the rotating locking member 12 such that the rotating locking member 12 can be rotated between locked and unlocked positions.

Figure 1:
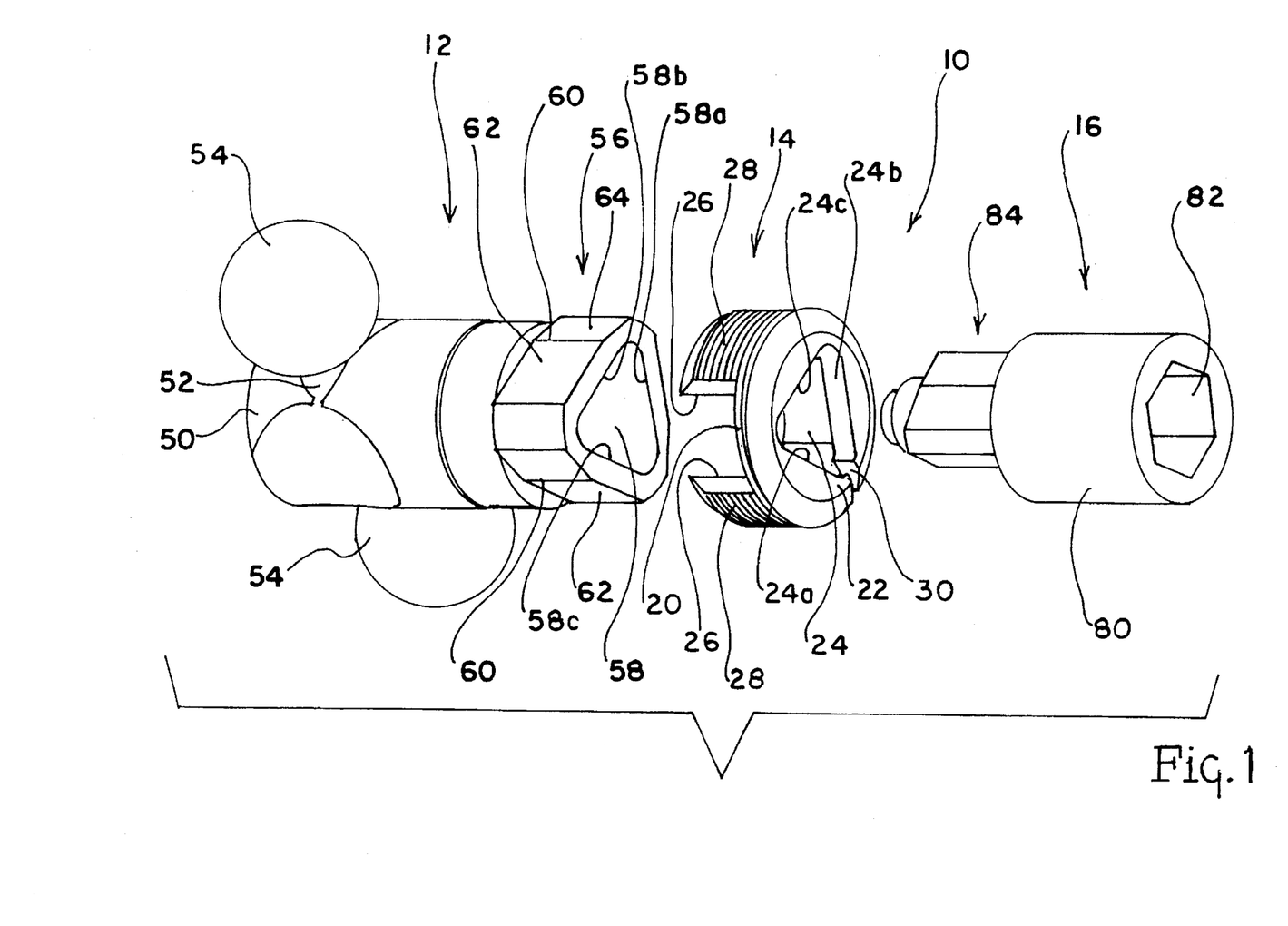
FIG. 1 is an exploded-perspective view of a design of the self-locking mechanism of the present invention.
Figure 2:
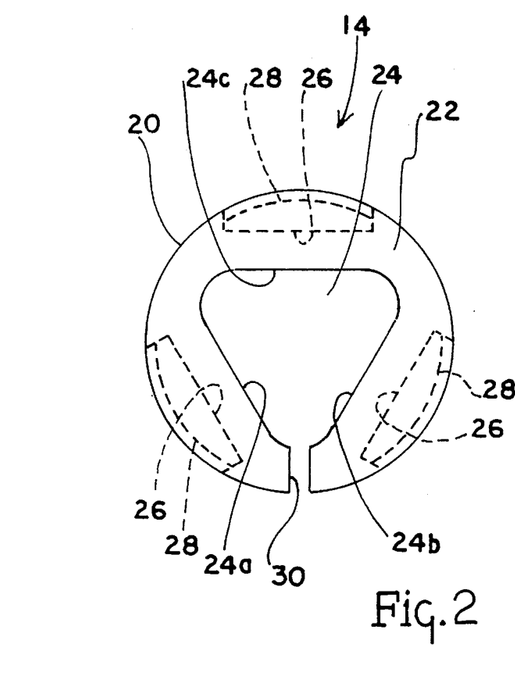
FIG. 2 is an end view, partially rotated, of the rotating carrier of the design shown in FIG. 1.

Turning to a discussion of the rotating carrier 14, it is seen that the same is of an open-type sleeve construction and includes an annular ring 20 and a top 22. A triangular opening 24 formed within the top and includes three sides 24a, 24b, and 24c. Depending from the annular ring 20 is a series of circumferential wedge surfaces 26. About the exterior of the rotating carrier 14 and particularly about the exterior of the wedge surfaces 26, it is seen that the rotating carrier 14 includes exterior threads 28. In addition, an elongated slot 30 is formed in the side of the rotating carrier 14 to provide a certain degree of flexibility to the rotating carrier.

While throughout this discussion and illustrated in the figures are exterior threads 28 about the rotating carrier 14 which engage a matching set of threads within the tool holder 126 (FIG. 5), it should be understood that the rotating carrier 14 may be engaged within the tool holder 126 through friction created by an interference fit thereby eliminating the necessity of mating threads. Under such circumstances, the wedging action between the cam head 56 and the rotating carrier 14 would increase this friction to further secure the rotating carrier 14 within the tool holder 126.

Turning to the rotating locking member 12, the same is shown herein in the form of a lock rod 50. Lock rod 50 as used in a tool block and tool holder, to be subsequently described herein, includes a ramp surface 52 for engaging each of a series of locking balls 54. As will be appreciated in subsequent portions of this disclosure, the lock rod 50 is typically secured within a tool holder assembly and is operative to urge locking balls 54 into and out of engagement with a plurality of apertures formed in a shank portion of the tool holder.

Secured to a remote end of the lock rod 50 is the cam head indicated generally by the numeral 56. Cam head 56 is designed to project into the rotating carrier 14 and to cooperate therewith in locking the lock rod 50. Cam head 56 includes an open center 58 that has defined there around sides 58a, 58b, and 58c. The cam head 56 further includes a cam surface 60 that in the case of the present embodiment is disposed intermediately on each side and is generally curved or arcuately shaped. For clarity, the figures illustrate the cam surface 60 as a surface with a distinct edge. However, while such an embodiment would be workable, the preferred arrangement includes a smooth curved cam surface 60. Extending beside the cam surface 60 is a leading non-wedging flat surface 62. On the opposite side of the cam surface 60 is a trailing angle surface 64.

The rotating carrier 14 cooperates with the cam head 56 to secure the lock rod 50 in a locked position. As will be appreciated from subsequent portions of the disclosure, the respective cam surfaces 60 are operative to engage the respective wedge surfaces 26 of the rotating carrier 14 in such a fashion as to result in a wedge-locked relationship between the cam head 56 and the rotating carrier 14.

Completing the self-locking mechanism 10 is the driver that is indicated generally by the numeral 16. Driver 16 includes a main body 80 having a socket insert 82 formed on one end. Formed about the other end of the main body 80 is a turning head 84. Turning head 84 is designed to be inserted through the triangular opening 24 of the rotating carrier 14 and into and through the open center 58 of the cam head 56. As illustrated in FIG. 4, the turning head includes a plurality of separate sides. The sides are referred to as sides 86, 88, 90, 92, 94, 96, 98, 100 and 102. These sides are particularly designed to turn the rotating carrier 14 and the cam head 56 in unison. Also, as will be appreciated from subsequent portions of the disclosure, driver 16 is designed to impart relative rotation between the rotating carrier 14 and the cam head 56 to move the two elements from a wedged and locked position to an unlocked position.

Turning to FIG. 5, there is illustrated the self-locking mechanism incorporated into a tool block and holder assembly indicated generally by the numeral 120. Tool block and holder assembly 120 may be of the type manufactured and sold by Kennametal Inc. of Latrobe, Pennsylvania, identified as KM tooling. KM is a trademark of Kennametal Inc. used to identify quick-change tooling. For purposes of illustrating the self-locking mechanism 10, the tool block and holder assembly 120 is shown and includes a tool block 122 having a cavity 124 and wherein the tool block 120 is designed to accept and receive a tool holder 126. As seen in FIG. 5, the lock rod 50 is rotatably mounted within the tool block 122 and is adapted to be rotated from an unlocked position to a locked position. In the locked position, the lock rod via its cam surface 52 engages the locking balls 54 and urges the locking balls outwardly into locked engagement with the shank of the tool holder 126. The problem that the present invention overcomes is that of securing the lock rod 50 in the locked position such that the "back-off" forces and vibration due to certain harmonic frequencies do not urge the lock rod 50 from the locked position towards the unlocked position.

Thus, it is seen in FIG. 5 that the rotating carrier 14 is threaded within a bore of the tool block 122 and the cam head 56 secured to the outer terminal end of the lock rod 50 extends into the central opening of the rotating carrier 14 such that the respective wedge surfaces 26 surround the cam surfaces 60 of the cam head 56. It is preferable that the rotating carrier be secured within the tool block 122 such that there is drag acting against the rotating carrier 14 when the same is turned. This can be achieved by providing approximately 0.010 in. of interference between the threaded bore of the tool block 122 and the surface of the exterior threads 28 of the rotating carrier 14.

Turning to FIGS. 6–14, there is a sequence of views that illustrates the self-locking mechanism 10 of the present invention being moved from a non-wedged and unlocked mode to a wedged and locked mode and then back to a non-wedged and unlocked mode.

Figure 6:
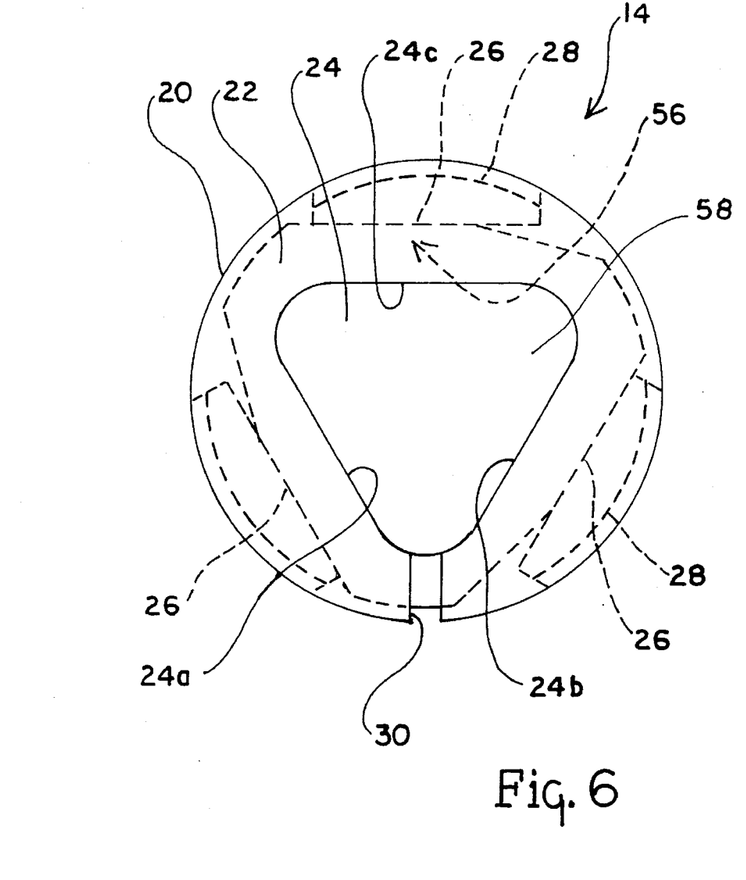
FIGS. 6–14 are a sequence of views illustrating the self-locking mechanism shown in FIG. 1 being turned from an unlocked position, to a locked position, and then back to an unlocked position.

First, consider the lock rod 50 in an unlocked position. In an unlocked position, the self-locking mechanism 10 assumes a non-wedged and unlocked mode. This is illustrated in FIG. 6. Note that the leading non-wedging flat surfaces 62 of the cam head 56 lie flush adjacent a portion of each wedge surface 26. In this mode, the sides of the triangle 24a, 24b, and 24c are basically aligned with the sides 58a, 58b, and 58c of the cam head 56.

Figure 7:
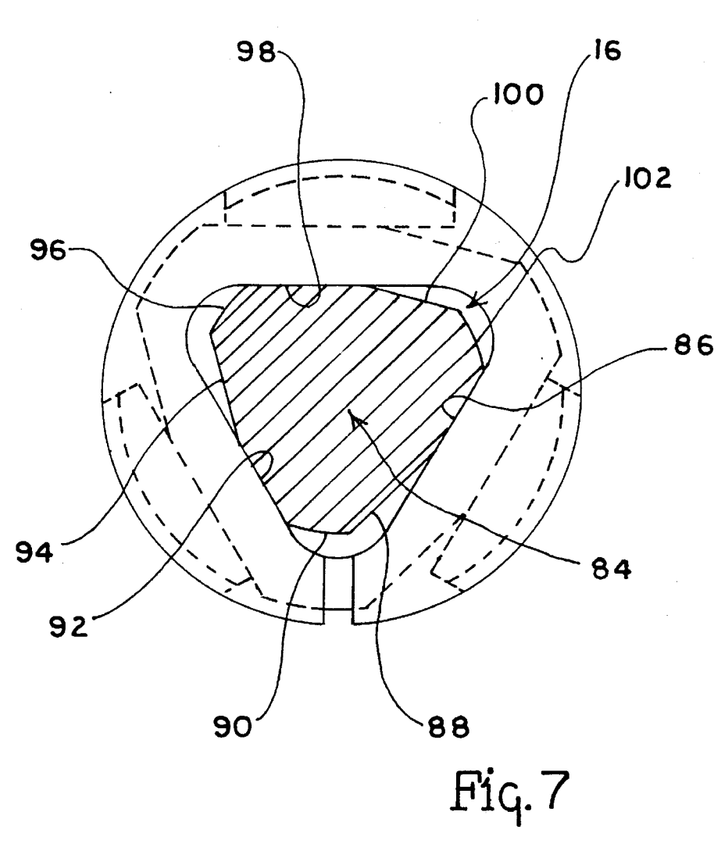

To move the lock rod 50 from its unlocked position (FIG. 6) to the locked position, the driver 16 is inserted through the triangular opening 24 of the rotating carrier 14 and through the open center 58 of the cam head 56. This is shown in FIG. 7. By rotating the driver 16 clockwise, the turning head 84 of the driver engages both the rotating carrier 14 and the cam head 56 and causes both to turn in unison. Since the cam head 56 is connected to the lock rod 50, it follows that the turning of the cam head 56 results in the lock rod 50 being turned clockwise also towards the locked position.

Figure 8:
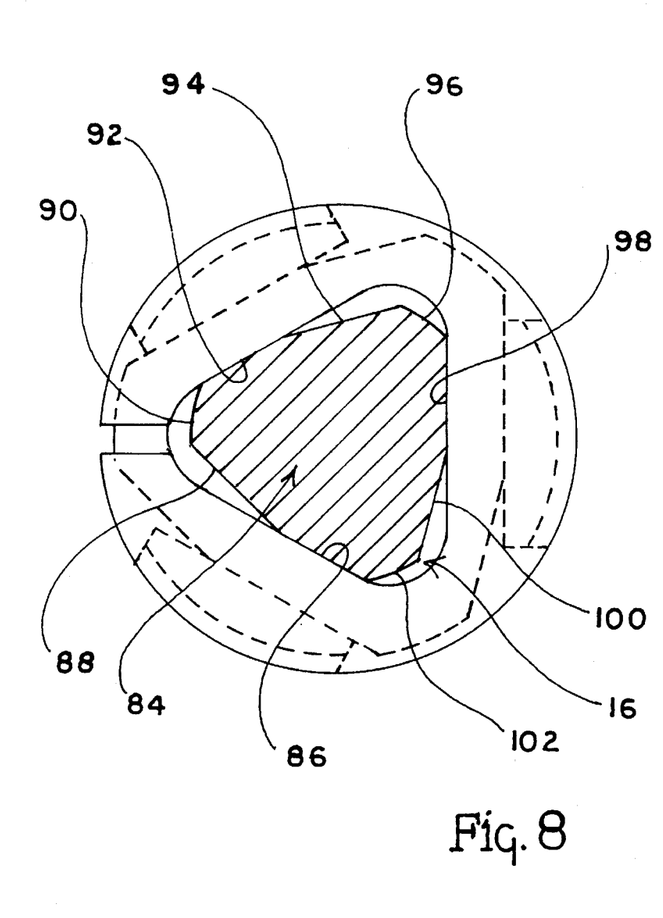
Figure 9:
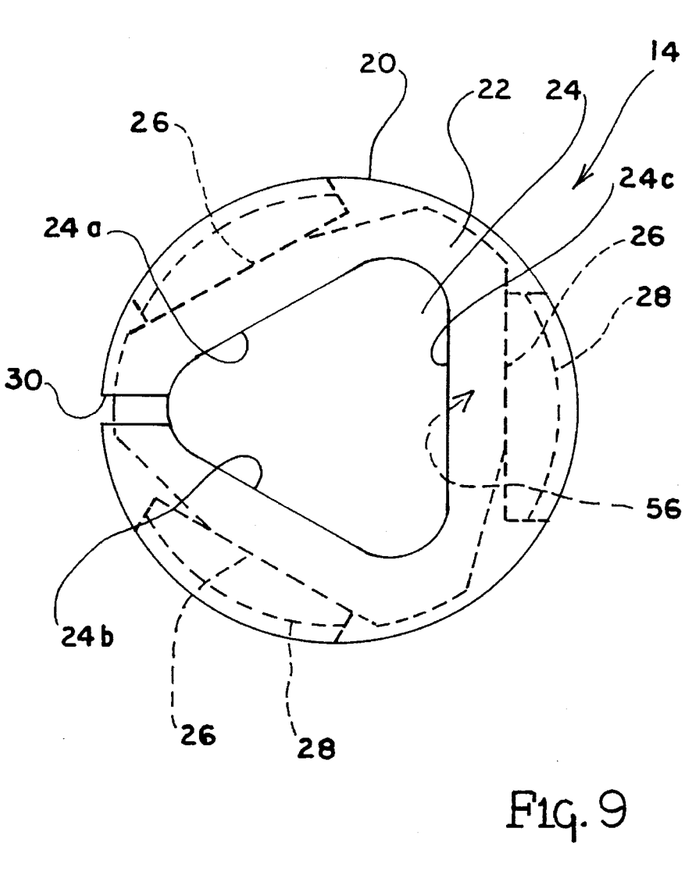

FIG. 8 shows the turning head 84 having been turned approximately one-quarter of a turn clockwise and that effectively places the lock rod 50 in its locked position. Next, as illustrated in FIG. 9, the turning head 84 is removed.

Figure 10:
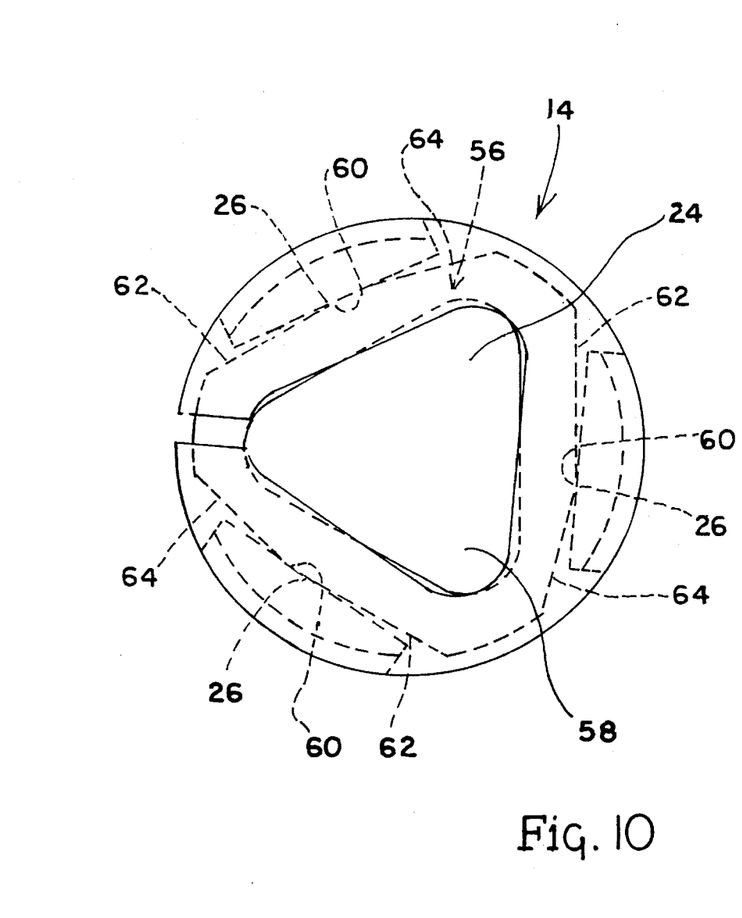

Once the turning head 84 has been removed, the cam head 56 will have a tendency to "back off" or turn counter-clockwise due to forces acting on the tool within the tool holder 126. Note in FIG. 10 that the cam head 56 has turned slightly counter clockwise due to such external forces. In turning slightly counter-clockwise as illustrated in FIG. 10, it is seen that the cam surfaces 60 disposed on each side 58a, 58b, and 58c have wedged against respective wedge surfaces 26 that form a part of the rotating carrier 14. This wedging action of the cam surfaces 60 bearing against the respective wedge surfaces 26 causes the rotating carrier 14 to expand and to lock, thereby resisting any counter-clockwise rotation. Thus, the lock rod 50 is securely locked by the rotating locking mechanism 10.

Figure 11:
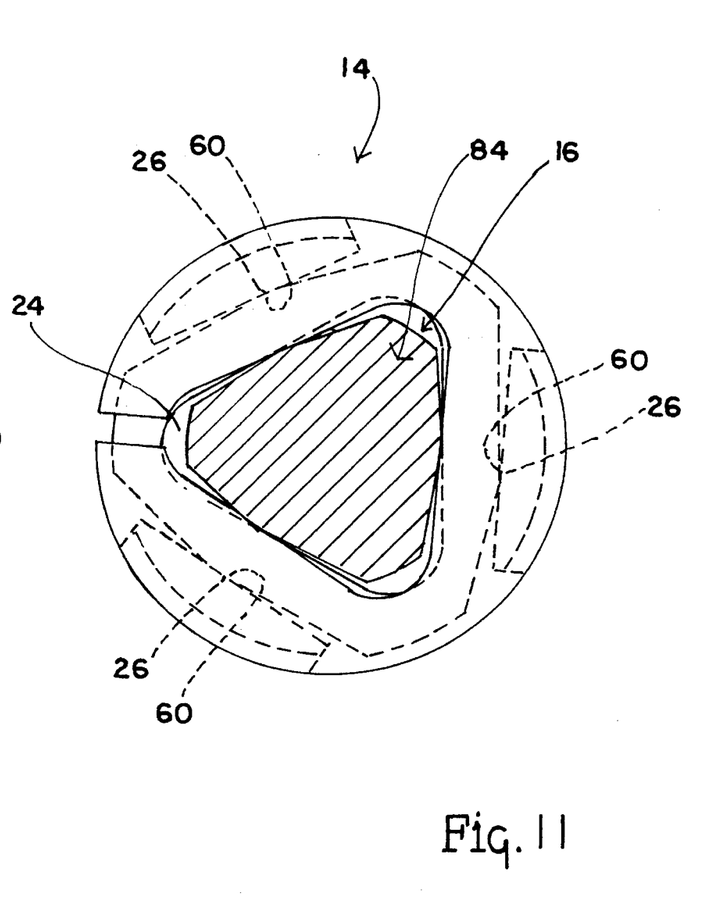
Figure 12:
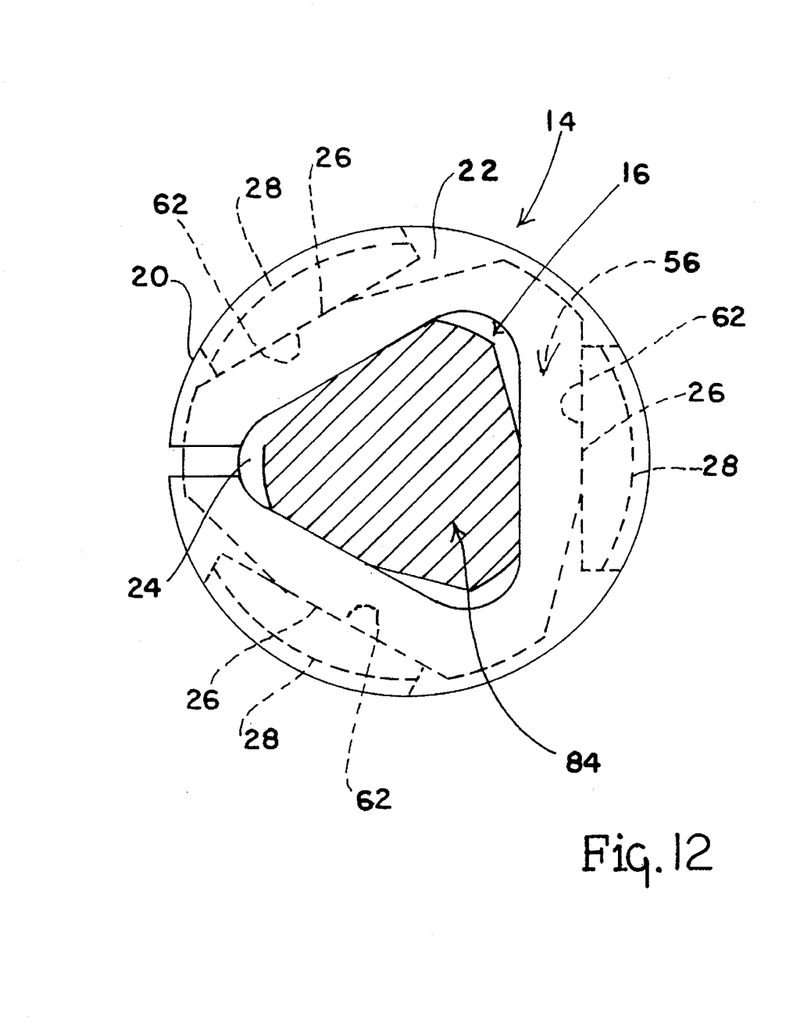
Figure 13:
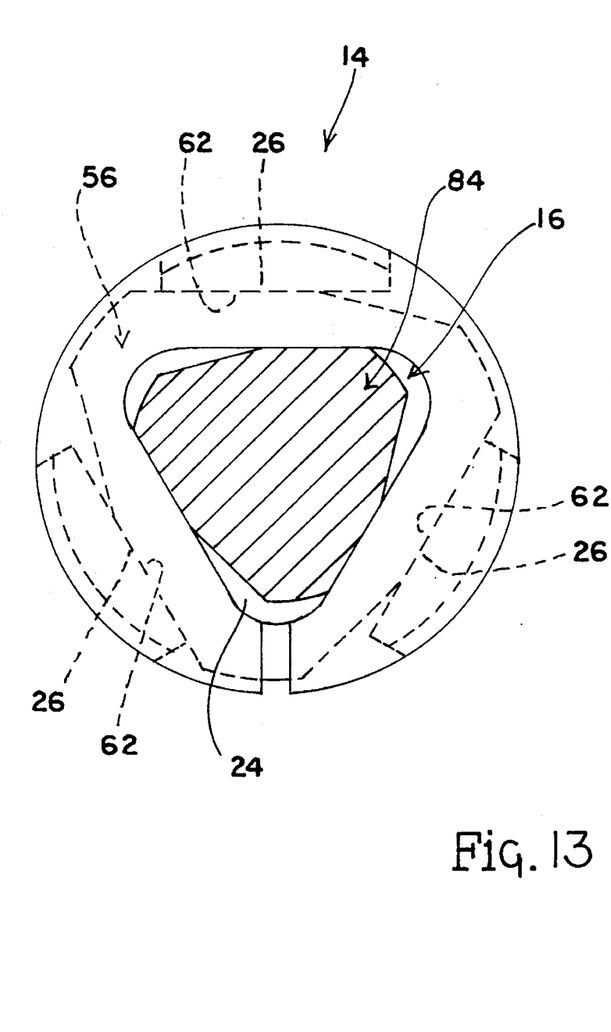
Figure 14:
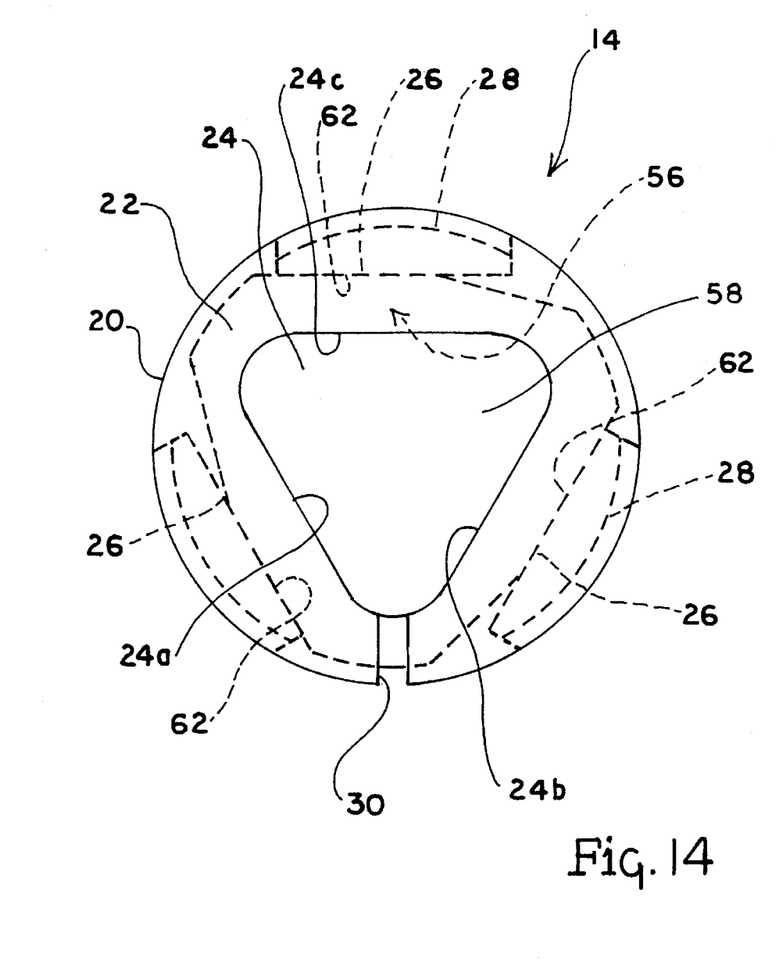

To rotate the lock rod 50 from the locked position shown in FIG. 10, the driver 16 is inserted through the triangular openings 24 within the rotating carrier 14 and on through the open center 58 of the cam head 56, as shown in FIG. 11. When the self-locking mechanism 10 is in the wedged and locked position shown in FIG. 10, it is appreciated that the interior side that makes up the triangular opening 24 (sides 24a, 24b, and 24c) and the sides that comprise the opened center 58 of the cam head (sides 58a, 58b, and 58c) are not aligned. In fact, these sides are slightly out of alignment because of the wedged relationship that exists between the rotating carrier 14 and the cam head 56. However, the sides of the turning head 84 of the driver 16 are designed such that the turning head 84 can be inserted into the triangle opening 24 of the rotating carrier 14 and into the open center 58 of the cam head when the self-locking mechanism is disposed in the wedged and locked position. Note in FIG. 11 that the sides of the turning head 84 engage the sides 24a, 24b, and 24c of the triangular opening 24 of the rotating carrier 14. Also note that the turning head 84 of the driver 16 is free to slightly rotate counter-clockwise before it engages the interior sides 58a, 58b, and 58c of the open center 58 of the cam head 56. Consequently, when unlocking the self-locking mechanism 10, the driver 16 is rotated slightly counter-clockwise from the position shown in FIG. 11 to the position shown in FIG. 12. During this movement, the cam head 56 remains stationary while the rotating carrier 14 rotates with the driver 16. Effectively, the rotating carrier 14 is rotated counter-clockwise such that its wedge surfaces 26 become dislodged from the cam surfaces 60 of the cam head 56. As shown in FIG. 12, the dislodged position occurs when the leading surfaces 62 align with and lie flush adjacent respective wedge surfaces 26. The rotating carrier 14 and the cam head 56 along with a lock rod 50 can be rotated counter-clockwise to the unlocked position shown in FIG. 13. Thereafter, the turning head 84 can be removed from the rotating carrier 14 and from the cam head 56 as shown in FIG. 14 and returns the assembly to the unlocked configuration shown in FIG. 6. To lock the lock rod 50 again, the steps illustrated in FIGS. 6–10 are repeated.

Figure 15:
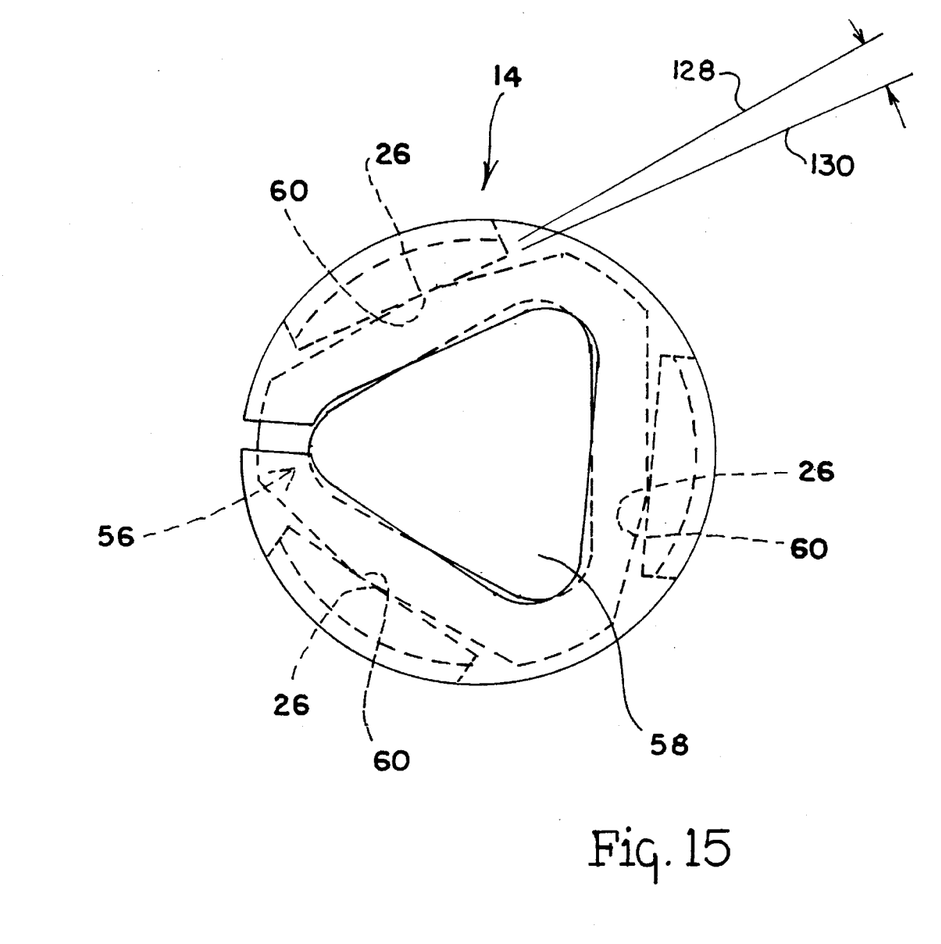
FIG. 15 is an end view illustrating a locking angle that exists between the rotating carrier and the cam head secured to the lock rod.

In FIG. 15, which shows the same configuration as FIG. 10, there is illustrated the locking angle created when the self-locking mechanism 10 assumes a wedged and locked position. As illustrated in FIG. 15, the locking angle is formed by construction line 130 which is aligned with or co-planar with a surface 26 of the rotating carrier 14 and construction line 128 which is drawn tangential to the cam surface 60 that is formed on a side of the open center 58 of the cam head 56. It is contemplated that the locking angle just described will range from 2°–10°. In a preferred design, it is contemplated that the locking angle would be approximately 5°–8°. In such a fashion, the relative motion between the rotating carrier 14 and the rotating locking member 12 will create movement between the wedge surfaces 26 and the cam surfaces 60 to generate force magnified by a mechanical advantage to secure the rotating carrier 14 and thereby the rotating locking member 12 within the tool holder 126 (FIG. 5).

It should be appreciated that the wedge surfaces 26 of the rotating carrier 14 and cam surfaces 60 of the rotating member 12 could be alternately associated with the rotating member 12 or rotating carrier 14.

From the foregoing specification and discussion, it is appreciated that the self-locking mechanism 10 of the present invention provides a reliable means for self-locking a lock rod or other type of rotating locking member in a locked position.

Finally what has been discussed is the application to this self-locking mechanism to an arrangement in which a lock rod is rotationally locked. It should be appreciated that the subject self-locking mechanism may be used in a variety of other applications in which a member is to be rotated and locked in a certain position.

What is claimed is:

1. A self-locking mechanism (10) for fixing a rotatable lock rod (50) within a tool block (122) to secure a tool holder (126) within the tool block (122) by comprising:
   (a) at least one cam surface (60) integral with the lock rod (50);
   (b) a centrally-opened rotating carrier (14) normally held within the tool block (122) and extending around the cam surface (60) of the lock rod (50);
   (c) the rotating carrier (14) having an inwardly facing wedge surface (26) disposed adjacent the cam surface (60) and wherein the wedge surface (26) and the cam surface (60) are so arranged and positioned such that the rotating carrier (14), cam surface (60) and lock rod (50) can be turned in unison as the lock rod (50) is moved between locked and unlocked positions;
   (d) a driver (16) engageable with the lock rod (50) for rotating the same between locked and unlocked positions and for simultaneously turning both the rotating carrier (14) and the cam surface (60) as the lock rod (50) is moved between locked and unlocked positions; and
   (e) wherein the wedge surface (26) of the rotating carrier (14) and the cam surface (60) integral with the lock rod (50) are arranged and positioned with respect to each other such that any tendency of the lock rod (50) to rotate from the locked position causes the cam surface (60) to engage the wedge surface (26) causing a binding action preventing any further unlocking movement of the lock rod (50).

2. The self-locking mechanism (10) of claim 1 wherein the driver (16) is operative to engage the rotating carrier (14) or the cam surface (60) and to rotate one relative to the other so as to release the wedging action between the wedge surface (26) and cam surface (60) and to permit the rotating carrier (14) and lock rod (50) to be rotated in unison such that the lock rod (50) can be moved from its locked position to the unlocked position and the tool holder (126) removed from the tool block (122).

3. The self-locking mechanism (10) of claim 2 wherein the rotating carrier (14) includes an outer annular ring (20) and wherein the wedge surface (26) is disposed on the inner side of the annular ring (20) and faces inwardly therefrom, and wherein the cam surface (60) projects into the annular ring (20) and faces outwardly towards the wedge surface (26) such that the wedge surface (26) and cam surface (60) are disposed adjacent to each other and face each other.

4. The self-locking mechanism (10) of claim 3 wherein there is provided a series of circumferentially-spaced wedge surfaces (26) facing inwardly from the annular ring (20), and wherein there is provided a plurality of cam surfaces (60) integral with the locking rod (50) that projects outwardly and faces the respective wedging surfaces (26).

5. The self-locking mechanism (10) of claim 1 wherein in a wedged and locked condition, a locking angle is formed between the wedge surface (26) and the cam surface (60) and wherein that locking angle is approximately 2–10°.

6. The self-locking mechanism (10) of claim 5 wherein the rotating carrier (14) includes exterior threads (28) and is threaded within a threaded bore formed in the tool block (122) and wherein the rotating carrier (14) is so sized that when threaded in the bore of the tool block (122) an interference fit is realized.

7. The self-locking mechanism (10) of claim 1 wherein the cam surface (60) is at least slightly curved shaped.

8. The self-locking mechanism (10) of claim 1 wherein the self-locking mechanism (10) includes biasing means (190) interposed between the rotating carrier (14) and the lock rod (50) for biasing and urging relative rotational movement between the two so as to give rise to a wedged and locked relationship between the rotating carrier (14) and the lock rod (50).

9. The self-locking mechanism (10) of claim 8 wherein the biasing means comprises a coil spring (190) having one end engaged with the rotating carrier (14) and the other end engaged with the lock rod (50) so as to give rise to a biasing action that urges the rotating carrier (14) and the lock rod (50) to rotate counter to one another.

10. A self-locking mechanism (10) for locking a rotating element (12) in a locking position comprising:
   (a) a rotating member (12) rotatable between locked and unlocked positions;
   (b) a self-locking mechanism (10) for locking the rotating member (12) in a locked position and including:
      (1) a rotating carrier (14);
      (2) an interlocking cam surface (60) and wedge surface (26) operatively interconnected between the rotating carrier (14) and the rotating locking member (12) for (1) rotating together in unison in an unlocked mode and (2) interlocking in a locked mode;
      (3) the wedge surface (26) being fixed to and rotatable with the rotating carrier (14) or the rotating member (12) and the cam surface (60) being fixed and rotatable with the other;
      (4) a driver (16) for (1) simultaneously rotating the rotating member (12), the rotating carrier (14), and the wedge and cam surfaces (26, 60); and (2) dislodging the cam and wedge surfaces (60, 26) when wedged and locked together such that the cam and wedge surfaces (60, 26) as well as the rotating member (12) and rotating carrier (14) can be rotated in unison and together; and
      (5) wherein the cam surface (60) and wedge surface (26) are so spaced and oriented such that the respective surfaces (60, 26) may be wedged and locked together in response to the rotating carrier (14) and the rotating member (12) tending to rotate from a locked position.

11. The self-locking mechanism (10) of claim 10 wherein the rotating member (12) and rotating carrier (14) are generally axially aligned and wherein the cam and wedge surfaces (60, 26) are radially aligned and spaced with respect to each other.

12. The self-locking mechanism (10) of claim 10 wherein the driver (16) includes a turning head (84) engageable with the rotating carrier (14) and the rotating member (12) for aligning the two by rotating one with respect to the other and for rotating the two in unison when aligned.

13. The self-locking mechanism (10) of claim 12 wherein the rotating carrier (14) is in the form of a rotating carrier (14) that includes an annular ring (20) that is provided with a slot (30) in a portion thereof which permits the annular ring (20) to expand and contract.

14. The self-locking mechanism (10) of claim 13 wherein the wedge or cam surfaces (26, 60) secured to the rotating carrier (14) is secured to the annular ring (20) and includes a face that is directed inwardly therefrom.

15. A self-locking mechanism (10) for securely locking a rotational member (12) in a locked position comprising:

(a) a rotating member (12);

(b) a rotating carrier (14) rotatably held within a housing (122) and generally axially aligned with the rotating member (12);

(c) cooperating wedge and cam surfaces (26, 60) interposed between the rotating carrier (14) and the rotating member (12) with the wedge surface (26) being secured to the rotating carrier (14) or to the rotating member (12) and the cam surface (60) being secured to the other;

(d) wherein the cam and wedge surfaces (60, 26) are generally radially aligned and spaced, and disposed in face-to-face relationship, and rotate about a generally common axis as the rotating carrier (14) and rotating member (12) are rotated;

(e) the wedge surface (26) and the cam surface (60) being disposed relative to each other such that in an unlocked mode, the two are disposed against each other in an aligned position and rotate in unison as the rotating carrier (14) and rotating member (12) are rotated;

(f) wherein the wedge surface (26) and cam surface (60) are configured such that one will wedge against the other in response to selective relative rotation, resulting in the rotating member (12) assuming a locked position with the wedging action of the wedge surface (26) and cam surface (60) preventing the rotating member (12) from rotating from its unlocked position; and (g) a driver (16) for imparting relative rotational movement between the cam surface (60) and wedge surface (26) so as to move the cam and wedge surfaces (60, 26) from the wedged and locked position and thereafter rotating the rotating carrier (14) and rotating member (12), cam surface (60) and wedge surface (26) in unison and together such that the rotating member (12) can be moved between its locked and unlocked positions.

16. The self-locking mechanism (10) of claim 15 wherein the cam surface (60) is non-planar and includes a generally planar segment (62) for aligning with the wedge surface (26) and wherein the cam surface (60) further includes a cam segment (60) that is at least slightly curved and is operative to engage and wedge against the wedging surface (26) to essentially lock the rotating member (12) in the locked position.

17. A method of self-locking a rotating locking member (12) comprising the steps of:

(a) rotating the rotating locking member (12) between locked and unlocked positions;

(b) rotating a self-locking mechanism (10) back and forth with the rotating locking member (12) as the rotating locking members move back and forth between locked and unlocked positions;

(c) locking the rotating locking member (12) in a locked position by driving a wedge surface (26) associated with the self-locking mechanism (10) into a wedged and locked position with a cam surface (60) also associated with the self-locking mechanism (10) and thereby locking the self-locking mechanism (10) from rotating;

(d) effectively connecting the self-locking mechanism (10) with the rotating locking member (12) such that the rotating locking member (12) cannot rotate from its locked position when the self-locking mechanism (10) is disposed in its locked position; and (e) unlocking the self-locking mechanism (10) by rotating the wedge and cam surfaces (26, 60) away from each other so as to dislodge the self-locking mechanism (10) and then rotating the self-locking mechanism (10) with the rotating locking member (12) and rotating the rotating locking member from the locked position to the unlocked position.

18. The method of claim 17 wherein the step of unlocking the self-locking mechanism (10) includes the step of rotating the wedge surface (26) from a lodged position and away from the cam surface (60) while the rotating locking member (12) remains relatively free of rotation.

* * * * *